United States Patent
Sethi (10) Patent No.: US 7,228,141 B2
(45) Date of Patent: Jun. 5, 2007

(54) PROVIDING LOCATION-SPECIFIC SERVICES TO A MOBILE NODE

(75) Inventor: Aseem Sethi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 10/746,901

(22) Filed: Dec. 23, 2003

(65) Prior Publication Data
US 2005/0138144 A1    Jun. 23, 2005

(51) Int. Cl.
*H04Q 7/20* (2006.01)
*H04L 12/28* (2006.01)
*G06F 15/16* (2006.01)

(52) U.S. Cl. .................. 455/456.3; 709/219; 709/228; 370/351

(58) Field of Classification Search ............. 455/435.1, 455/426.1, 456.3, 428, 411, 558, 426, 435; 370/356, 351; 705/26; 709/227
See application file for complete search history.

(56) References Cited

U.S. PATENT DOCUMENTS

| | | | |
|---|---|---|---|
| 6,208,857 B1 * | 3/2001 | Agre et al. | 455/428 |
| 6,665,537 B1 | 12/2003 | Lioy | 455/435 |
| 6,816,479 B1 * | 11/2004 | Euget et al. | 370/351 |
| 6,954,790 B2 * | 10/2005 | Forslow | 709/227 |
| 2001/0038626 A1 * | 11/2001 | Dynarski et al. | 370/356 |
| 2003/0083068 A1 * | 5/2003 | Wong | 455/435 |
| 2003/0125021 A1 * | 7/2003 | Tell et al. | 455/426 |
| 2003/0224757 A1 * | 12/2003 | Dyck et al. | 455/411 |
| 2003/0236709 A1 * | 12/2003 | Hendra et al. | 705/26 |
| 2004/0043791 A1 * | 3/2004 | Reddy | 455/558 |
| 2004/0157619 A1 * | 8/2004 | Corson et al. | 455/456.1 |
| 2004/0176103 A1 * | 9/2004 | Trossen et al. | 455/456.3 |

OTHER PUBLICATIONS

Global System for Mobile Communications, "3rd Generation Partnership Project; Technical Specification Group Services and System Aspects; General Packet Radio Service (GPRS); Service description; Stage 2 (Release 5)," 205 pages, 2003.

Global System for Mobile Communications, "3rd Generation Partnership Project 2—Wireless IP Network Standard," 61 pages, Jul. 2000.

Global System for Mobile Communications, "3rd Generation Partnership Project; Technical Specification Group Services and System Aspects; Functional stage 2 description of LCS (Release 5)," 75 pages, 2003.

(Continued)

*Primary Examiner*—Joseph Feild
*Assistant Examiner*—Kiet Doan
(74) *Attorney, Agent, or Firm*—Baker Botts L.L.P.

(57) ABSTRACT

A method for providing network services includes receiving a configuration request. The configuration request identifies a mobile node. The method also includes determining a location of the mobile node and selecting a directory agent based at least on the location of the mobile node. Additionally, the method includes transmitting to the mobile node a configuration response that identifies the directory agent.

25 Claims, 2 Drawing Sheets

OTHER PUBLICATIONS

Global System for Mobile Communications, "3rd Generation Partnership Project; Technical Specification Group Core Network; Universal Geographical Area Description (GAD) (Release 5)," 29 pages, 2003.

E. Guttman et al., "Service Location Protocol, Version 2," Network Working Group, RFC 2608, 49 pages, Jun. 1999.

E. Guttman et al., "Service Templates and Service: Schemes," Network Working Group, RFC 2609, 30 pages, Jun. 1999.

Point-to-Point Protocol Field Assignments, 17 pages, Sep. 15, 2003.

R. Droms, "Dynamic Host Configuration Protocol," Network Working Group, RFC 2131, 41 pages, Mar. 1997.

W. Simpson, "The Point-to-Point Protocol (PPP)," Network Working Group, RFC 1661, 48 pages, Jul. 1994.

C. Perkins et al., "DHCP Options for Service Location Protocol," RFC 2610, 6 pages, Jun. 1999.

Global System for Mobile Communications, "3rd Generation Partnership Project; Technical Specification Group Core Network; Numbering, addressing and identification (Release 5)," 42 pages, 2003.

P. Faltstrom, "E.164 number and DNS," Network Working Group, RFC 2916, 9 pages, Sep. 2000.

C.E. Perkins, "Service Location Protocol for Mobile Users," PIMRC, 6 pages, 1998.

* cited by examiner

PROVIDING LOCATION-SPECIFIC SERVICES TO A MOBILE NODE

TECHNICAL FIELD OF THE INVENTION

This invention relates in general to network services and, more particularly, to a method and system for providing location-specific services to a mobile node.

BACKGROUND OF THE INVENTION

Significant improvements in the global telecommunication infrastructure over recent decades have made it possible to provide mobile communication services to users located essentially anywhere in the world. Furthermore, technological advancements have made it increasingly easy for mobile users to seamlessly transition between services provided by various networks. As geographic constraints become less limiting, the importance of providing a full range of voice, media, and data services to users (regardless of their location) has increased dramatically.

Additionally, as the Internet becomes the common platform for providing services to mobile communication users, the dynamic, distributed nature of the Internet creates difficulties in effectively providing services to mobile users. Because the respective locations of the mobile user and the service provider may be relevant in finding an appropriate service provider for the mobile user, conventional mobile communication systems have experienced increasing difficulties in matching mobile users and service providers. Accordingly, the ability to provide appropriate services and features to accommodate a diverse group of end users presents a significant challenge to system administrators, component manufacturers, and service providers.

SUMMARY OF THE INVENTION

In accordance with the present invention, the disadvantages and problems associated with the provisioning of mobile communication services have been substantially reduced or eliminated.

In accordance with one embodiment of the present invention, a method for providing network services includes receiving a configuration request that identifies a mobile node and determining a location of the mobile node. The method further includes selecting a directory agent based at least on the location of the mobile node and transmitting a configuration response to the mobile node. The configuration response identifies the directory agent.

In accordance with another embodiment of the present invention, a method for providing network services includes receiving a service request that includes a requested service type and a location of a mobile node. The method further includes selecting a service agent based, at least, on the service type and the mobile node location. A service response may be transmitted to the mobile node. The service response identifies the service agent.

Technical advantages of certain embodiments of the present invention may include providing location-specific services to users of mobile communication networks. Other technical advantages of certain embodiments of the present invention include reducing latency for users of network services and providing location information for physical components associated with particular network services.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
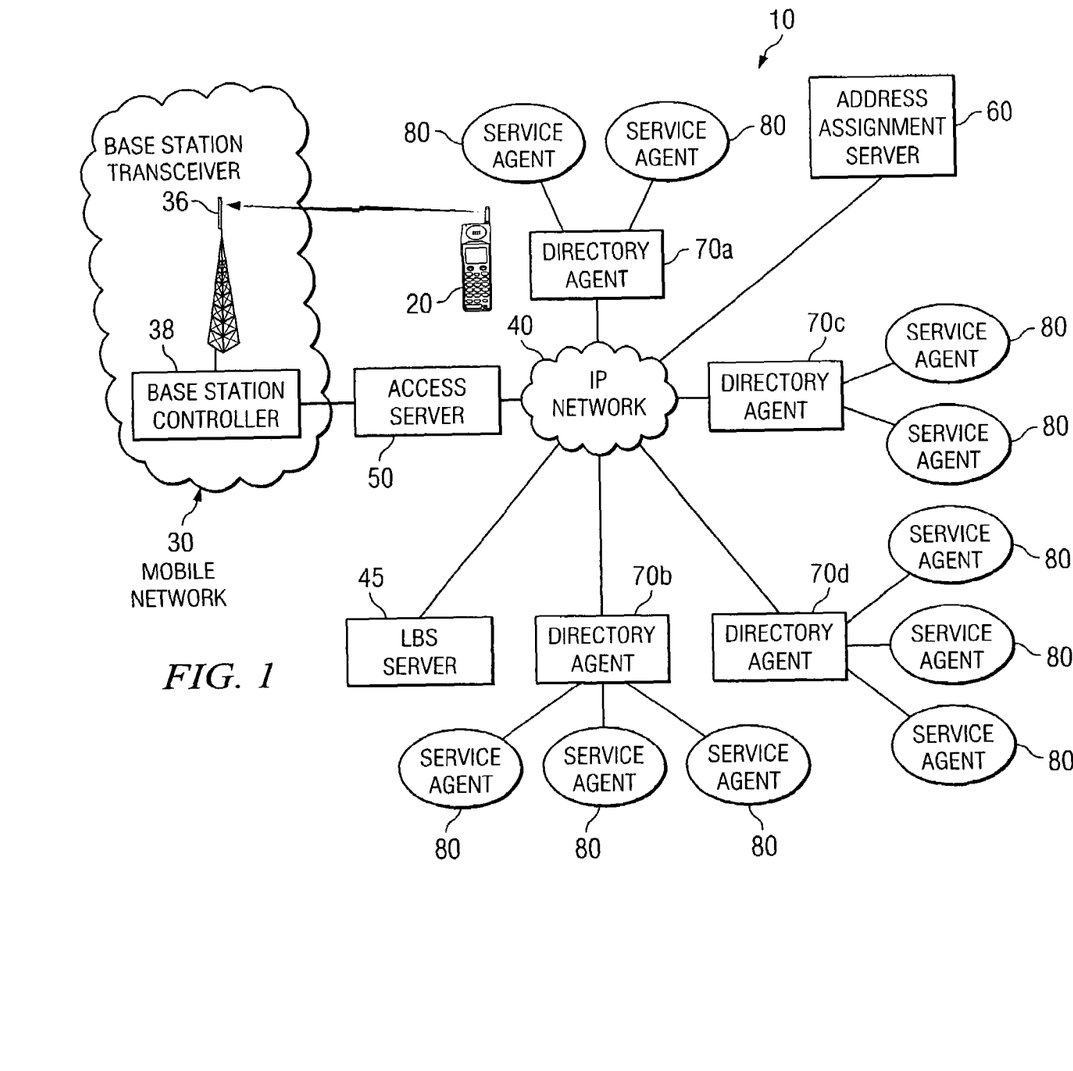
FIG. 1 is a simplified block diagram depicting a communication system in accordance with one embodiment of the present invention.

FIG. 1 is a simplified block diagram of a communication system 10 for communicating data in a network environment. Communication system 10 may include a mobile node 20, and a mobile network 30, which may further include a base transceiver station 36 and a base station controller/packet control function (PCF) element 38. Communication system 10 may also include an Internet protocol (IP) network 40, an access server 50, an address assignment server 60, a set of directory agents 70a-d, and one or more service agents 80. Communication system 10 may also include a location-based service (LBS) server 45 in certain embodiments of the present invention, as explained more fully below.

Communication system 10 of FIG. 1 may be generally configured or arranged to represent a 3G communication architecture applicable to a Global System for Mobile (GSM) environment in accordance with a particular embodiment of the present invention. However, the 3G architecture is offered for purposes of example only and may alternatively be substituted with any suitable networking protocol or arrangement that provides a communicative platform for communication system 10. For example, communication system 10 may cooperate with any version of a general packet radio service (GPRS) tunneling protocol (GTP) or any code-division multiple access (CDMA) architecture that includes access operations or capabilities. This may be inclusive of first generation, 2G, 2.5G, and SS-7 network architectures and configurations that provide features for executing access procedures.

In accordance with the teachings of the present invention, communication system 10 provides location-specific network services to a mobile user according to a service allocation protocol, such as Service Location Protocol (SLP) for example defined in RFC 2608. Because communication system 10 determines the location of mobile node 20 and because communication system 10 monitors the location of various directory agents 70a-d and service agents 80, communication system may effectively match mobile node 20 with suitable network services. For example, where the service provided by service agent 80 is tied to a particular physical component, such as a printer or fax machine, or where network characteristics favor the use of local resources, communication system 10 may provide communication services to mobile node 20 more efficiently.

For purposes of teaching, it is helpful to provide some overview of the way in which services are provided in a network operating according to SLP. Although operations are described with respect to SLP, this is for the purposes of example only. This description is not in anyway intended to limit the scope of the teachings to networks utilizing SLP.

SLP is a scalable protocol for the discovery of network services. SLP provides a flexible framework for providing hosts with access to information about the existence, location, and configuration of networked services. Individual instances of network services that are available on communication system 10 may be identified and added (or subtracted) as appropriate based on the characteristics and configurations of communication system 10.

In a network supporting SLP, each network service is associated with a service agent 80. Service agent 80 may receive requests for services associated with service agent 80 and facilitate the provisioning of these services. Service agents 80 may represent computer processes running on servers connected to IP network 40, or any other components capable of providing the described functionality. For example, service agent 80 may represent a printer daemon capable of receiving print requests and completing print jobs at an associated printer. Directory agents 70*a-d* monitor IP network 40 and store location and other information about service agents presently available on IP network 40. Like service agent 80, directory agents 70*a-d* represent computer processes running on a server connected to IP network 40, or any other components capable of providing the described functionality. Such functionalities may be executed with the use of suitable algorithms, software, hardware, application-specific integrated circuits (ASICs), or via any other suitable component, device, element, or object where appropriate and potentially based on particular needs. These elements may be provided within directory agents 70*a-d* or may be provided external thereto and cooperate therewith.

When a new service agent 80 comes online on IP network 40, service agent 80 registers with a selected directory agent 70*a-d* by sending a service advertisement to the selected directory agent 70*a-d* describing the services offered by service agent 80. The selected directory agent 70*a-d* caches this information in a memory associated with the selected directory agent 70*a-d* and makes the information available to users of IP network 40 requesting services. If service agent 80 does not renew registration with the selected directory agent 70*a-d* within a predetermined time, the service advertisement may expire and the selected directory agent 70*a-d* may delete the service advertisement. As a result, the selected directory agent 70*a-d* may maintain an updated list of the service agent 80 currently available on IP network 40 and the services offered by each.

When a user, such as mobile node 20, logs on to IP network 40, or otherwise becomes connected to IP network 40, the user locates the selected directory agent 70*a-d* by sending a multicast service request to all directory agents 70 on IP network 40 to which the selected directory agent 70*a-d* responds, by receiving an unsolicited service advertisement which the selected directory agent 70*a-d* may periodically multicast to users or to service agent 80 on IP network 40, or by contacting address assignment server 60.

After locating the selected directory agent 70*a-d*, a user seeking a particular service on IP network 40 issues a service request to the selected directory agent 70*a-d* that specifies the characteristics of the service the user seeks. In response, the user receives a service response from the selected directory agent 70*a-d* specifying the given service agents 80 in the network, which satisfy the request. The service response may identify the service agent 80 by a network address, such as a Uniform Resource Locator (URL), an Internet Protocol (IP) address, or any other appropriate form of identification.

The user may then communicate with the identified service agent 80 directly at the address specified in the service response. For example, the user may send files associated with the specified URL to be printed. The user, however, does not necessarily know the physical location of any components associated with service agent 80. Because IP network 40 is a dynamic and distributed configuration of components, a user may be unable to determine whether the location of service agents 80 identified by the selected directory agent 70*a-d* is appropriate for performing the desired service under certain circumstances. For example, after sending a print job to a print daemon service agent 80, a user of mobile node 20 may be unable to locate the associated printer and the completed printouts. In fact, depending on the geographic span of IP network 40, the printer may be located a great distance from the user.

Thus, communication system 10 can provide an approach to network services that is more efficient than other communication approaches. This is due, in part, to the fact that the location of mobile node 20 may be considered in identifying components of communication system 10 for use by mobile node 20. Furthermore, geographic information about the components of communication system 10 may be provided to mobile node 20 to improve its decision-making. Additional details relating to the operation of communication system 10, as well as its potential applications, are provided below.

Mobile node 20 represents an end user, a client, or a customer wishing to initiate a communication in communication system 10 via IP network 40. Mobile node 20 may be inclusive of devices used to initiate a communication, such as a computer, a personal digital assistant (PDA), a laptop or an electronic notebook, a telephone, a mobile station, a mobile terminal, or any other device, component, element, or object capable of initiating voice or data exchanges within communication system 10. Mobile node 20 may also be inclusive of a suitable interface to the human user, such as a microphone, a display, a keyboard, or other terminal equipment (such as, for example, an interface to a personal computer or to a facsimile machine in cases where mobile node 20 is used as a modem). Mobile node 20 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Mobile network 30 is a communications interface between mobile node 20 and access server 50. Mobile network 30 may also be representative of terminal equipment (TE) (and accordingly these terms may be used interchangeable herein in this document) used to offer a communications platform or to provide connectivity to one or more mobile nodes 20. Mobile network 30 may comprise a base transceiver station 36 and a base station controller 38 in one embodiment. The communications interface provided by mobile network 30 offers connectivity and allows data to be exchanged between mobile node 20 and any number of selected elements within communication system 10. Mobile network 30 may also facilitate the delivery of a service request generated by mobile node 20 and the reception of information sought by mobile node 20. Mobile network 30 is only one example of a communications interface between mobile node 20 and access server 50. Other types of communications interfaces may be used for any desired network design and based on particular needs.

IP network 40 represents a series of points or nodes of interconnected communication paths for receiving and transmitting packets of information that propagate through communication system 10. IP network 40 offers a communicative interface between mobile node 20 and selected locations within the network, such as address assignment server 60. IP network 40 may be representative of a service provider or any suitable local area network (LAN), wireless local area network (WLAN), metropolitan area network (MAN), wide area network (WAN), virtual private network (VPN), or any other appropriate architecture or system that facilitates communications in a network environment. IP network 40 implements a user datagram protocol (UDP)/ internet protocol (UDP/IP) communication language protocol in a particular embodiment of the present invention; however, IP network 40 may alternatively implement any other suitable communication protocol (e.g. transmission control protocol (TCP)/IP) for transmitting and receiving data or information within communication system 10).

Access server 50 is a network node that facilitates a communication session involving mobile node 20. In one embodiment, access server 50 is a packet data service node (PDSN) that is capable of providing a platform from which point-to-point (PPP) sessions may be executed. A PDSN may provide access to the Internet, Intranets, and wireless application protocol (WAP) servers for mobile stations utilizing mobile network 30. The PDSN may act as an access gateway and provide simple IP and mobile IP access, foreign agent support, and packet transport. Alternatively, access server 50 may be any packet gateway that is operable to facilitate packet communications. For example, access server 50 may fill the role of a network access server (NAS), where appropriate, in providing layer two connectivity for a network. Access server 50 may provide a communications medium in a GPRS service network environment in communicating data exchanges within communication system 10.

In another example embodiment of the present invention, access server 50 is a serving general packet radio service (GPRS) support node (SGSN) or a gateway GPRS support node (GGSN), providing a communications medium in a GPRS service network environment. Where communication system 10 is implemented in a GPRS environment, a series of IP network gateways may be provided and each may include a GGSN that works in conjunction with the SGSNs in communicating high-speed data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between GSM mobile stations and external packet data networks. GPRS may support multiple Internet communication protocols and may enable existing IP, X.25, or any other suitable applications or protocols to operate over GSM connections.

Address assignment server 60 assigns and stores addresses for active directory agents 70 on IP network 40 and, when queried, can provide the addresses to users such as mobile node 20. Address assignment server 60 may represent a Dynamic Host Configuration Protocol (DHCP) server, a Bootstrap Protocol (BOOTP) server, or any other appropriate component capable of assigning network addresses on IP network 40. Address assignment server 60 may identify an IP address or other suitable network address for an appropriate directory agent 70a-d in response to a configuration request by mobile node 20. Address assignment server 60 may comprise hardware, software, or any combination thereof which allows address assignment server 60 to assign network addresses to service agents 80, directory agents 70, and other components of IP network 40. Address assignment server 60 also stores geographic information describing a location for each directory agent 70a-d.

Additionally, address assignment server 60 may be capable of determining a location of mobile node 20 or receiving location information for mobile node 20 from other components. Address assignment server 60 may consider this location information when providing a selected directory agent 70a-d address in response to queries from mobile node 20. Thus, according to particular embodiments, address assignment server 60 offers a more effective process for determining the appropriate directory agent 70a-d for mobile node 20.

LBS server 45, included in particular embodiments of communication system 10, determines the location of mobile components in communication system 10 and communicates the location to requesting clients, such as address assignment server 60. LBS server 45 represents any component capable of receiving requests identifying a mobile component, for example, by International Mobile Subscriber Identity (IMSI) or Mobile Identifier (MID), and providing location information for the mobile component. LBS server 45 may include, couple to, or otherwise communicate with satellites, directional antennas, and/or any other appropriate space-based or terrestrial elements for determining the location of mobile components.

In operation, mobile node 20 initiates a communication session with IP network 40 through mobile network 30. The particular process by which mobile node 20 initiates the communication session depends on the configuration and characteristics of communication system 10. In a particular embodiment, communication system 10 represents a CDMA2000 system, and mobile node 20 initiates a PPP session with access server 50 using an R-P Interface established between mobile network 30 and access server 50. Mobile node 20 is then capable of communicating with components on IP network 40 through the channel established by the PPP session.

During initiation of the communication session, access server 50 provides mobile device 20 with a network address for address assignment server 60. Returning to the CDMA2000 example, access server 50 may be configured to return an IP address of address assignment server 60 such as a DHCP server. Mobile device 20 may then send a service request to the network address of address assignment server 60 requesting a network address for an appropriate directory agent 70a-d. Mobile device 20 may perform this step upon receiving the network address of address assignment server 60 or may wait until mobile device 20 attempts to utilize any network service.

Upon receiving a configuration request from mobile node 20, access server 50 determines a location of mobile node 20. In a particular embodiment, address assignment server 60 may act as an LBS client and request location information for mobile node 20 from LBS server 45, providing an IMSI or other identifying information to LBS server 45 and receiving, in response, information describing the location of mobile node 20. In a particular embodiment, mobile node 20 is equipped with a global positioning system (GPS) and provides address assignment server 60 location information when requesting an address for a selected directory agent 70*a-d*. In general, address assignment server 60 may determine the location of mobile node 20 in any appropriate manner, using any suitable components available in communication system 10.

Regardless of how address assignment server 60 determines the location of mobile node 20, address assignment server 60 then selects an appropriate directory agent 70*a-d* from a memory associated with address assignment server 60. As noted above, address assignment server 60 maintains a database containing network addresses of directory agents 70 active on IP network 40. Additionally, the database stores geographic information for each directory agent 70*a-d*. This geographic information may specify an exact location of the particular directory agent 70*a-d*, identify a broad geographic region for the particular directory agent 70*a-d*, or describe the location of the particular directory agent 70*a-d* in any appropriate manner. Based on the geographic information of directory agents 70 and location information of mobile node 20, address assignment server 60 selects an appropriate address assignment server 60 for mobile node 20 based on the configuration and characteristics of communications system 10. As one example, address assignment server 60 may unconditionally choose the closest directory agent 70*a-d* to mobile node 20. As another example, address assignment server 60 may choose from a number of directory agents 70 within a predetermined distance from mobile node 20 based on other factors, e.g., the number of mobile nodes 20 currently using each directory agent 70*a-d*.

Address assignment server 60 sends a directory response to mobile node 20 that includes the network address of directory agent 70*a*. For purposes of example and teaching only, directory agent 70*a* is illustrated and discussed as being a local directory agent. Mobile node 20 may immediately use the network address for local directory agent 70*a* for a service request or may store the address in a memory of mobile node 20. When mobile node 20 later attempts to locate a service on communication system 10, mobile node 20 accesses the memory to retrieve the stored address of a selected directory agent 70*a-d*.

Once mobile node 20 has received the directory response, mobile node 20 may locate services on communication system 10 by sending a service request to local directory agent 70*a*. The service request may identify the type of service requested and may include information specifying the location of mobile node 20. The information may specify an exact location of mobile node 20, identify a broad geographic region in which mobile node 20 is located, or otherwise describe the location of mobile node 20 in any suitable manner. In a particular embodiment of communication system 10, the service request represents an SLP Service Request Message that additionally specifies a location of mobile node 20.

In response to the service request, local directory agent 70*a* selects a service agent 80 for mobile node 20. Local directory agent 70*a* may select a given service agent 80 for mobile node 20 in any appropriate manner, depending on the configuration and characteristics of communication system 10. As one example, local directory agent 70*a* may identify, from among those service agents 80 currently subscribed to local directory agent 70*a*, all service agents 80 having a service type that matches the service type of the service request. Then, local directory agent 70*a* may identify the matching service agent 80 closest to mobile node 20. As another example, local directory agent 70*a* may identify a particular service agent 80, based on the requested service type and other factors, from among those service agents 80 that are located within a predetermined maximum distance from mobile node 20.

After selecting a particular service agent 80, local directory agent 70*a* transmits a service response, such as an SLP Service Reply Message, to mobile node 20 identifying the selected service agent 80. The service response may identify the service agent 80 by a network address, such as a URL, an IP address, or any other appropriate form of identification. Additionally, in a particular embodiment, the service response may identify the geographic location of a selected service agent 80 or of associated physical components. This geographic location may be useful to a user of mobile node 20 in utilizing the selected service agent 80 and in determining whether the selected service agent 80 will be acceptable. For example, returning to the printer scenario for service agent 80, the geographic location may be useful for a user attempting to locate printouts that have been generated by the selected printer service agent 80.

According to a particular embodiment of communication system 10, the various directory agents 70 are configured geographically, with each directory agent 70*a-d* serving as a directory for service agents 80 in a particular geographic area. Thus, mobile node 20 by using local directory agent 70*a* to discover services, not only utilizes directory agent 70 (which is local to mobile node 20), but also directory agent 70, which monitors services local to mobile node 20. As a result, communication system 10 allows for improved service discovery. For example, by referencing the printer service agents 80 stored in local directory agent 70*a*, a user of mobile node 20 may be able to locate a service agent 80 associated with a printer near the current location of the user.

Additionally, by configuring communication system 10 so that a particular selected directory agent 70*a-d* is associated with service agents 80 near the selected directory agent 70*a-d*, transmission times between the selected directory agent 70*a-d* and associated service agents 80 will be reduced, particularly in communication architectures spanning significant distances. Thus, the information in the selected directory agent 70*a-d* will more quickly reflect status changes for service agents 80 available on IP network 40.

Figure 2:
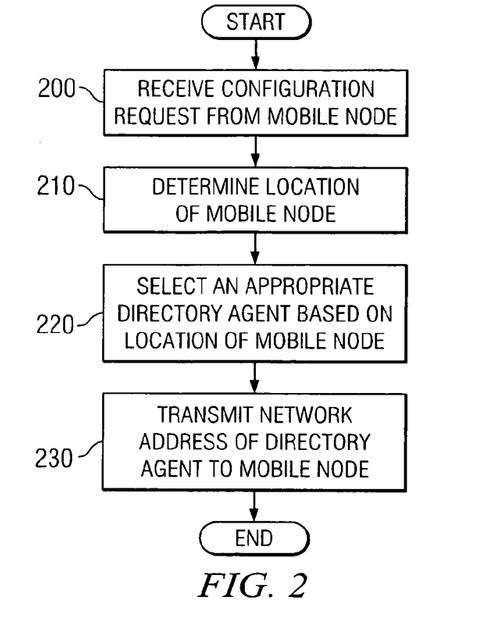
FIG. 2 is a simplified flowchart depicting a series of example steps associated with a method for identifying a directory agent for a mobile node in the communication system.

FIG. 2 is a flowchart illustrating an example operation of address assignment server 60 according to a particular embodiment of communication system 10. At step 200, address assignment server 60 receives a configuration request from mobile node 20. As noted above, where address assignment server 60 represents a DHCP server, a configuration request may represent a DHCPREQUEST message transmitted by mobile node 20 to address assignment server 60. At step 210, address assignment server 60 determines the location of mobile node 20. Address assignment server 60 may request the location from an LBS server 45, determine the location based on information included in the configuration request, or ascertain the location in any other appropriate manner.

Once address assignment server 60 has determined the location of mobile node 20, address assignment server 60 selects an appropriate directory agent 70*a-d* (e.g. local directory agent 70*a*), for mobile node 20 based, at least in part, on the location of mobile node 20. This is reflected by step 220. As noted above, address access server 50 maintains a database that includes a network address, geographic information, and other characteristics for each directory agent 70a-d in IP network 40. At step 230, address assignment server 60 transmits the network address of local directory agent 70a (in this example scenario) to mobile node 20. Address assignment server 60 may communicate the network address of local directory agent 70a to mobile node 20 in a response to the configuration request, e.g. as a DHCPACK message, or as part of any other suitable communication between address assignment server 60 and mobile node 20.

Figure 3:
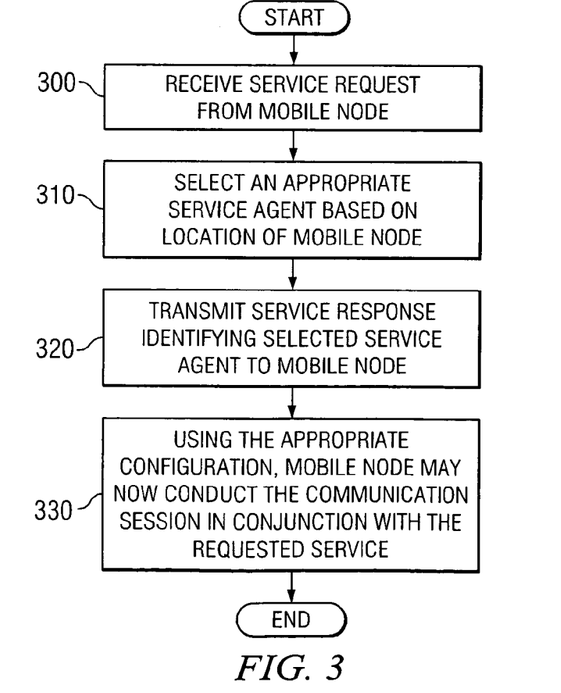
FIG. 3 is a simplified flowchart depicting a series of example steps associated with a method for identifying a service agent for a mobile node in the communication system.

FIG. 3 is a flowchart illustrating an example operation of a selected directory agent 70a-d according to a particular embodiment of communication system 10. At step 300, the selected directory agent 70a-d receives a service request from mobile node 20. The service request identifies a type of service requested by mobile node 20 and the location of mobile node 20.

The selected directory agent 70a-d selects a particular service agent 80 from a list of service agents stored by the selected directory agent 70a-d at step 310. The selected directory agent 70a-d selects the particular service agent 80 based on the location of mobile node 20, the location of service agents of the requested type, and other appropriate factors. At step 320, the selected directory agent 70a-d transmits a service response to mobile node 20. The service response identifies the network address of the selected service agent 80. At step 330 and with the correct service configuration in place, mobile node 20 may conduct its communication session with the service request being enabled by service agent 80.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Some of the steps illustrated in FIGS. 2 and 3 may be changed or deleted where appropriate and additional steps may also be added to the flowcharts. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of these elements may be provided as separate external components to communication system 10 or to each other where appropriate. The present invention contemplates great flexibility in the arrangement of these elements as well as their internal components.

In addition, although the preceding description offers a protocol to be implemented with particular devices (e.g. access server 50, service agent 80, and directory agents 70a-d), the protocol provided may be embodied in a fabricated module that is designed specifically for effectuating the techniques as provided above. Moreover, such a module may be compatible with any appropriate architecture other than the described platforms, which were offered for purposes of teaching and example only.

Additionally, although numerous example embodiments provided above reference voice data, communication system 10 may cooperate with any other type of data in which compression protocols are applicable. For example, normative or standard data, video data, and audio-visual data may benefit from the teachings of the present invention. Communication system 10 provides considerable adaptability in that it may be used in conjunction with any information that is sought to be compressed in a communications environment.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method for providing network services comprising:
   receiving a configuration request, wherein the configuration request identifies a mobile node;
   determining a location of the mobile node;
   selecting a directory agent based at least on the location of the mobile node, the directory agent operable to monitor a network having one or more service agents, and the directory agent operable to store location and service type information at least the service agents; and
   transmitting a configuration response to the mobile node, wherein the configuration response identifies the directory agent; wherein
   the configuration request identifies the mobile node by an International Mobile Subscriber Identity (IMSI) number; wherein
   determining the location of the mobile node comprises: transmitting a Location Based Service (LBS) request to an LBS server, wherein the LBS request includes the IMSI of the mobile node; and receiving an LBS response, wherein the LBS response includes the location of the mobile node.

2. The method of claim 1, wherein the configuration response identifies the directory agent by an Internet Protocol (IP) address.

3. The method of claim 1, wherein the configuration request includes location information provided by a Global Positioning System (GPS) receiver associated with the mobile node, and wherein determining a location of the mobile node comprises determining a location of the mobile node based on the location information.

4. A method for providing network services comprising:
   receiving a service request from a mobile node, wherein the service request includes a requested service type and a location of the mobile node;
   selecting a service agent based on at least the service type and the location of the mobile node; and
   transmitting a service response, wherein the service response identifies the service agent; wherein selecting the service agent comprises:

reading a plurality of service agent records stored in a memory, wherein each service agent record identifies a service agent and includes a service agent location and an offered service type; identifying one or more matching service agents, wherein the matching service agents have a service type that matches the requested service type; and selecting, from the matching service agents, the matching service agent located closest to the location of the mobile node.

5. The method of claim 4, wherein the service response identifies the service agent by an Internet Protocol (IP) address.

6. The method of claim 4, wherein selecting the service agent comprises selecting the service agent closest to the location of the mobile node.

7. An apparatus for identifying available on a network comprising:
an address assignment server, the address assignment server operable to:
receiving a configuration request, wherein the configuration request identifies a mobile node;
determining a location of the mobile node; selecting a directory agent based at least on the location of the mobile node, the directory agent operable to monitor a network having one or more service agents, and the directory agent operable to store location and service type information at least the service agents; and
transmitting a configuration response to the mobile node, wherein the configuration response identifies the directory agent; wherein
the configuration request identifies the mobile node by an International Mobile Subscriber Identity (IMSI) number; wherein
determining the location of the mobile node comprises: transmitting a Location Based Service (LBS) request to an LBS server, wherein the LBS request includes the IMSI of the mobile node; and receiving an LBS response, wherein the LBS response includes the location of the mobile node.

8. The apparatus of claim 7, wherein the configuration response identifies the directory agent by an Internet Protocol (IP) address.

9. The apparatus of claim 7, wherein the configuration request includes location information provided by a Global Positioning System (GPS) receiver associated with the mobile node, and wherein the location of the mobile node is determined based on the location information.

10. An apparatus for identifying services available on a network, comprising:
a directory agent, operable to:
monitor a network having one or more service agents;
store location and service type information at least the service agents;
receive a service request, wherein the service request includes a requested service type and a mobile node location;
select a service agent based on at least the service type and the mobile node location; and
transmit a service response, wherein the service response identifies the service agent, wherein
the directory agent is operable to select the service agent by:
reading a plurality of service agent records stored in a memory, wherein each service agent record identifies a service agent and includes a service agent location and an offered service type;
identifying one or more matching service agents, wherein the matching service agent have a service type that matches the requested service type; and
selecting from the matching service agents, the matching service agent located closest to the location of the mobile node.

11. The apparatus of claim 10, wherein the service response identifies the service agent by an Internet Protocol (IP) address.

12. The apparatus of claim 10, wherein the directory agent is operable to select the service agent by selecting the service agent closest to the location of the mobile node.

13. Software for identifying service available on a network, the software being embodied in a computer readable medium and comprising computer code such that when executed is operable to:
receiving a configuration request, wherein the configuration request identifies a mobile node;
determining a location of the mobile node;
selecting a directory agent based at least on the location of the mobile node, the directory agent operable to monitor a network having one or more service agents, and the directory agent operable to store location and service type information at least the service agents; and
transmitting a configuration response to the mobile node, wherein the configuration response identifies the directory agent; wherein
the configuration request identifies the mobile node by an International Mobile Subscriber Identity (IMSI) number; wherein
determining the location of the mobile node comprises: transmitting a Location Based Service (LBS) request to an LBS server, wherein the LBS request includes the IMSI of the mobile node; and receiving an LBS response, wherein the LBS response includes the location of the mobile node.

14. The medium of claim 13, wherein the configuration response identifies the directory agent by an Internet Protocol (IP) address.

15. The medium of claim 13, wherein the configuration request includes location information provided by a Global Positioning System (GPS) receiver associated with the mobile node, and wherein determining a location of the mobile node comprises determining a location of the mobile node based on the location information.

16. Software for identifying service available on a network, the software being embodied in a computer readable medium and comprising computer code such that when executed is operable to:
receive a service request, wherein the service request includes a requested service type and a mobile node location;
select a service agent based on at least the service type and the mobile node location; and
transmit a service response, wherein the service response identifies the service agent,
wherein the software is further operable to select the service by;
reading a plurality of service agent records stored in a memory, wherein each service agent records identifies a service agent and includes a service agent location and an offered service type; identifying one or more matching service agents, wherein the matching service agents have a service type that matches the requested service type; and
selecting from the matching service agents, the matching service agent located closest to the location of the mobile node.

17. The medium of claim 16, wherein the service response identifies the service agent by an Internet Protocol (IP) address.

18. The medium of claim 16, wherein the code is further operable to select the service agent by selecting the service agent closest to the location of the mobile node.

19. The medium of claim 16, wherein the software is further operable to select the service agent by:
reading a plurality of service agent records stored in a memory, wherein each service agent record identifies a service agent and includes a service agent location and an offered service type;
identifying one or more matching service agents, wherein the matching service agents have a service type that matches the requested service type; and selecting from the matching service agents, the matching service agent located closest to the location of the mobile node.

20. A system for providing a network service comprising:
a mobile node, operable to transmit a configuration request identifying the mobile node and to transmit a service request identifying a requested service type;
an access server, operable to receive the configuration request and to identify a directory agent for the mobile node based on a location of the mobile node, the directory agent operable to monitor a network having one or more service agents, and the directory agent operable to store location and service type information at least the service agent; and
a plurality of directory agents, each directory agent operable to receive a service request and to transmit a service response, the service response identifying a service agent of the requested service type; wherein
the configuration request identifies the mobile node by an International Mobile Subscriber Identity (IMSI) number; further comprising;
a Location Based Service (LBS) server, wherein the access server is operable to transmit a location request, and wherein the LBS server is operable to receive the location request and to transmit a location response identifying location of the mobile node.

21. The system of claim 20, wherein the configuration request includes location information provided by a Global Positioning System (GPS) receiver associated with the mobile node.

22. The system of claim 20, wherein the configuration request further identifies position information, and wherein determining a location of the mobile node comprises determining a location of the mobile node based on the position information.

23. The system of claim 20, further comprising:
a plurality of service agents, wherein each directory agent is further operable to select one of the service agents based on the location of the mobile node and to transmit a service response, the service response identifying the selected service agent.

24. A system for providing network service comprising:
means for receiving a configuration request, wherein the configuration request identifies a mobile node;
means for determining a location of the mobile node;
means for selecting a directory agent based at least on the location of the mobile node, the directory agent operable to monitor a network having one or more service agents, and the directory agent operable to store location and service type information at least the service agents; and
means for transmitting a configuration response to the mobile node, wherein the configuration response identifies the directory agent; wherein
the configuration request identifies the mobile node by an International Mobile Subscriber Identity (IMSI) number; wherein
determining the location of the mobile node comprising: transmitting a Location Based Server (LBS) request to an LBS server, wherein the LBS request includes the IMSI of the mobile node; and receiving and LBS response, wherein the LBS response includes the location of the mobile node.

25. A system for providing network service comprising:
means for receive a service request, wherein the service request includes a requested service type and a mobile node location;
means for select a service agent based on at least the service type and the mobile node location; and
means for transmit a service response, wherein the service response identifies the service agent, wherein selecting the service agent comprises:
reading a plurality of service agent records stored in a memory, wherein each service agent record identifies a service agent and includes a service agent location and an offered service type; identifying one or more matching service agents, wherein the matching service agents have a service type that matches the requested service type; and selecting, from the matching service agents, the matching service agent located closest to the location of the mobile node.

* * * * *